United States Patent [19]

Kamata

[11] Patent Number: 5,378,281
[45] Date of Patent: Jan. 3, 1995

[54] PRETREATING APPARATUS FOR ADHESION OF PLASTIC SHEET MATERIALS

[76] Inventor: Yoshiyuki Kamata, 1-19-13, Yashio Yashio-shi, Saitama-ken, Japan

[21] Appl. No.: 944,246

[22] Filed: Sep. 14, 1992

[30] Foreign Application Priority Data

Sep. 13, 1991 [JP] Japan .................. 3-262659
Sep. 30, 1991 [JP] Japan .................. 3-278835

[51] Int. Cl.⁶ .................................... B05C 11/00
[52] U.S. Cl. .............................. 118/264; 118/206; 118/212; 118/224; 118/227; 118/249; 118/239; 118/253; 118/258; 118/268; 15/102
[58] Field of Search ............ 118/206, 211, 212, 223, 118/224–227, 244, 249, 239, 253, 258, 264, 268; 15/102

[56] References Cited

U.S. PATENT DOCUMENTS

| | | | |
|---|---|---|---|
| 1,127,538 | 2/1915 | Staude | 118/249 |
| 2,079,563 | 5/1937 | Reuter | 118/239 |
| 3,011,913 | 12/1961 | Pierce et al. | 118/249 |
| 3,440,675 | 4/1969 | Yeaman | 15/102 |
| 4,106,432 | 8/1978 | Gunther, Jr. | 118/239 |
| 4,129,919 | 12/1978 | Fitch et al. | 15/102 |
| 4,570,566 | 2/1986 | Long | 118/206 |
| 4,908,670 | 3/1990 | Ndebi | 118/264 |
| 4,962,721 | 10/1990 | Peek | 118/264 |
| 4,995,434 | 2/1991 | Janatka | 118/264 |
| 5,232,499 | 8/1993 | Kato et al. | 118/264 |

Primary Examiner—W. Gary Jones
Assistant Examiner—Mark De Simone
Attorney, Agent, or Firm—Sughrue, Mion, Zinn, Macpeak & Seas

[57] ABSTRACT

An apparatus is provided for pretreating plastic sheets having poor adhesive properties, with a primer treatment. The primer treatment includes a sheet conveyor for conveying plastic sheets in one direction at a constant speed. A flexible, porous friction member is arranged so as to come into contact with adhesive areas of the plastic sheets. A press confronts the friction member and presses the plastic sheet against the friction member. A primer solution is supplied to the friction member where it is transmitted to the plastic sheet.

26 Claims, 7 Drawing Sheets

PRETREATING APPARATUS FOR ADHESION OF PLASTIC SHEET MATERIALS

BACKGROUND OF THE INVENTION

1. Field of the Invention

The present invention relates to a pretreating apparatus for the adhesion of plastic sheets, and more particularly, is directed to a pretreating apparatus which confers a primer treatment and an adhesive application treatment onto areas to be coated with adhesive of plastic sheet having poor adhesive properties preparatory to the adhesion thereof.

2. Description of the Related Arts

Plastic sheets, in particular, transparent or translucent rigid plastic sheets have been often used in the form of packages or cases for accommodating foods or a variety of groceries and packing them. The process of manufacturing the packages or cases generally comprises the steps of previously applying adhesive onto adhesive joints of plastic sheets cut in accordance with a predetermined development, introducing the plastic sheets into an adhesive bonding apparatus to fold them, and pressurizing or heating under pressure the adhesive joints for the adhesion.

Some plastic sheets have good adhesive properties and others present a poor ones. For example, polyvinyl chloride plastic sheets are satisfactory in adhesive properties, whereas sheets made of polyolefin plastic such as polyethylene or polypropylene plastic are extremely poor. It is difficult to directly bond such plastic sheets having poor adhesive properties, and hence their adhesive joints must be subjected to a primer treatment for surface roughening preparatory to the application of the adhesive in a pretreating apparatus.

For use in such primer treatment, for example, available are primer solutions such as Aron primer (pretreatment agent for aron alpha which is an instantaneous adhesive) from Toagosei Chemical Industry Co., Ltd. and Cyano primer from Koatsu Gas Kogyo Co., Ltd. Paper or cloth impregnated with such primer solution is used to wipe the adhesive joints to roughen them.

Such conventional manner of pretreating before adhesion is, however, inefficient and poor in reliability. Particularly, the primer treatment involves the following critical problems.

(i) The treatment with the primer solution is often ununiform, which inevitably leads to unevenness of surface roughening.

(ii) In an extreme case, a portion possibly remains unroughened.

(iii) The applied primer solution may be squeezed out of the adhesive joints, which remarkably impairs the outward appearance when assembled into packages or cased and lowers the product value.

(iv) The treatment is slow in speed.

(v) The automatization of the subsequent adhesive bonding step is difficult to carry out due to the unreliability of the treatment and the slowness of treatment speed.

SUMMARY OF THE INVENTION

It is therefore an object of the present invention to provide an improved pretreating apparatus having a primer treatment means for the adhesion of plastic sheets and an adhesive application means and intended to overcome the above problems involved in the conventional treatment process preparatory to adhesion.

Another object of the present invention is to provide a PRETREATING apparatus capable of performing a uniform and reliable primer treatment and having a primer treatment means whose throughput speed is high.

A still another object of the present invention is to provide a pretreating apparatus having a primer treatment means capable of simultaneously executing a primer treatment on a pair of adhesive areas of the plastic sheet which are brought together.

A further object of the present invention is to provide a pretreating apparatus including not only the primer treatment means but also an adhesive application means having a transfer disc of the type which effectively prevents the adhesive from interlocking even in case of the use of adhesives with a remarkable tendency to interlock such as cyano instantaneous adhesive.

The above objects of the present invention can be accomplished by a pretreating apparatus for the adhesion of plastic sheets including a primer treating means and an adhesive applying means, the primer treating means comprising a sheet conveyance means for conveying the plastic sheets in one direction at a constant speed; a friction means made of flexible porous member and arranged to be in contact with the adhesive area of the plastic sheets to be subjected to a primer treatment; a press means disposed facing the friction means and for pressing the plastic sheet against the friction member; and a primer solution supply means for the supply of the primer solution to the friction member.

The adhesive application means to be employed in the pretreating apparatus of the present invention may be any means commonly used in this field. Such adhesive application means may include, for example, spray nozzle type and rotary transfer disc type.

It is preferable in the present invention, however, to use a specifically structured transfer disc type adhesive application means in case of the use of adhesives remarkably easy to interlock such as cyano instantaneous adhesive. That adhesive application means comprises a sheet conveyance means for conveying the plastic sheet in one direction at a constant speed, a container having at its lower portion an adhesive supply section and having at its upper portion an opening facing a sheet passage surface in the sheet conveyance means, and a transfer disc rotatably accommodated within the container and having an upper outer periphery being in contact with the adhesive supply section and a lower outer periphery coming into contact with the sheet passage surface through the opening, the adhesive of the adhesive supply section being transferred onto the adhesive area of the plastic sheet moving through the sheet passage surface by virtue of the rotation of the transfer disc.

Furthermore, the transfer disc is rotatably supported on a horizontal shaft, the horizontal shaft extending through the interior of the container and passing through a through-hole provided in a partition wall thereof and being journalled in a bearing. The through-hole has an inner diameter about 0.7 to 2.0 mm larger than the outer diameter of the portion of the horizontal shaft which is received in the through-hole. An adhesive stop is further provided between the through-hole and the bearing.

The foregoing and the other objects, features and advantages of the present invention will become more apparent with reference to the following description in conjunction with the accompanying drawings which illustrate, not exclusively, exemplary preferred embodiments of the present invention.

DESCRIPTION OF THE PREFERRED EMBODIMENTS

Figure 1:
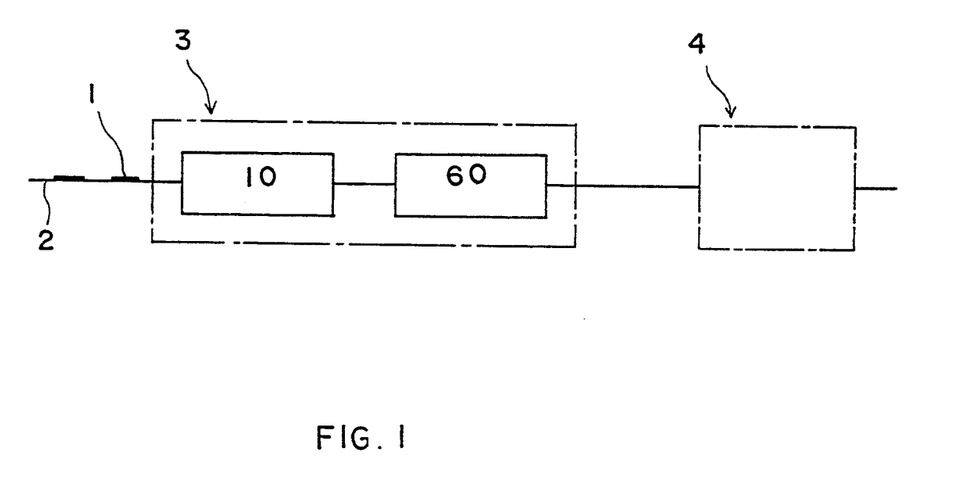
FIG. 1 is an explanatory view for explaining the relationship between the pretreating apparatus of the present invention and an adhesive bonding apparatus.

Referring first to FIG. 1, plastic sheets 1 cut in accordance with a predetermined development are conveyed by a conveying means 2 such as a roller conveyor unit for the treatment through a pretreating apparatus 3 and a adhesive bonding apparatus 4 in sequence. More specifically, the plastic sheets 1 introduced into the pretreating apparatus 3 are first subjected to a primary treatment by a primary treating means 10, and through an application of an adhesive by an adhesive application means 60 are then discharged from the pretreating apparatus 3. Subsequently, the plastic sheets enter the adhesive bonding apparatus 4 where the sheets are folded along predetermined folds and adhesive joints are pressurized or heated under pressure for adhesion. Such adhesive bonding apparatus well known in carton manufacturing industry may also be used for a plastic sheet with some modifications. However, the adhesive bonding apparatus itself is not the subject of the present invention, and hence the description thereof will be omitted.

Figure 2:
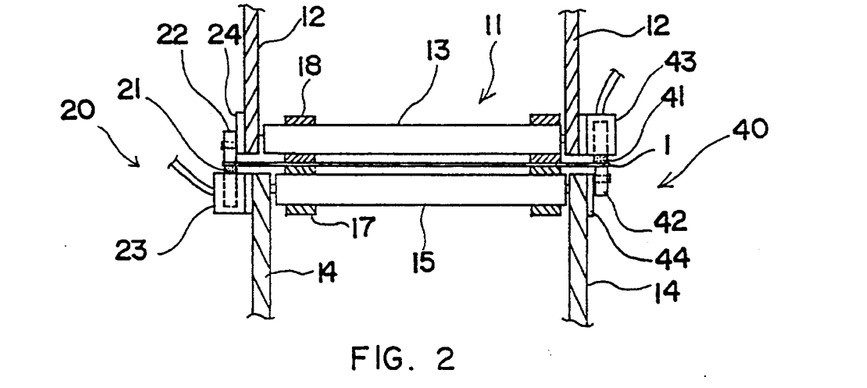
FIG. 2 is a partly sectional view showing an example of the primer treatment means employed in the pretreating apparatus of the present invention.
Figure 5:
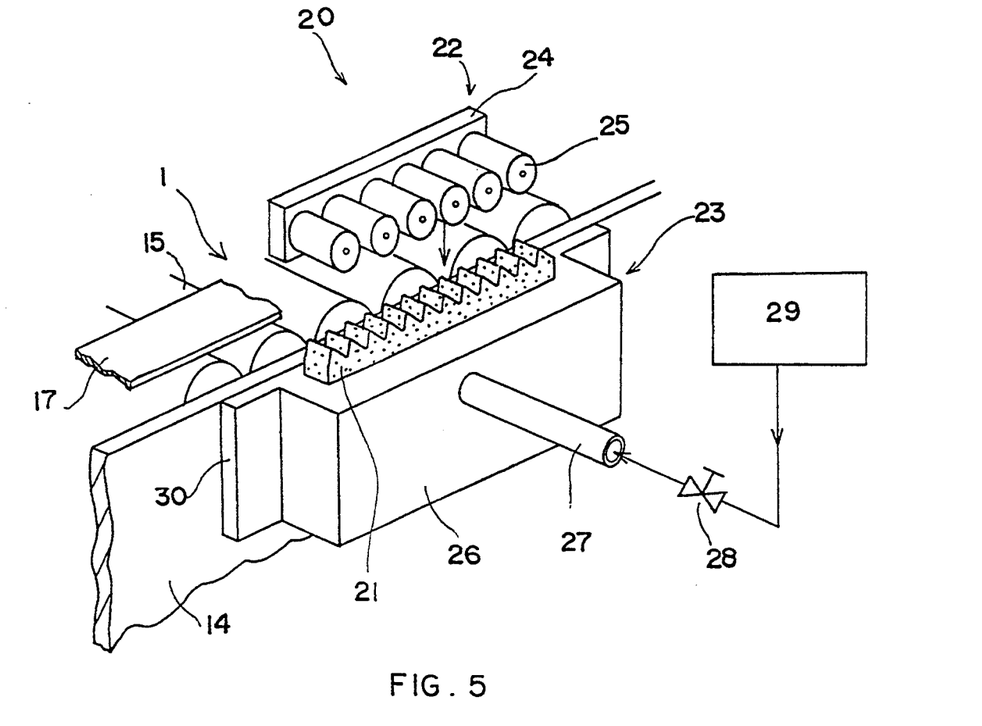
FIG. 5 is a partly exploded perspective view showing the primer treatment means in an enlarged scale.

FIG. 2 is a partly diagrammatic sectional view of a primer treatment means in the pretreating apparatus according to the present invention, while FIG. 5 is a partially exploded perspective view thereof. As seen in FIG. 2, a sheet conveyance means 11 has at its both sides correspondingly a pair of primer treatment means 20 and 40 arranged in a centrosymmetrical manner with respect to the center of the conveying unit. As shown in FIG. 5, the sheet conveyance means 11 includes a multiplicity of lower drive rollers 15 rotatably supported in a lower frame 14 and placed perpendicularly to the direction in which the sheets are allowed to be conveyed, and a multiplicity of upper drive rollers 13 (FIG. 2) horizontally journalled in an upper frame 12 and juxtaposed in the same manner. The multiplicity of upper drive rollers 13 are turned together by an upper endless belt 18, while the multiplicity of lower drive rollers 15 are turned together by a lower endless belt 17, thus permitting the plastic sheets 1 to pass through a gap defined by both the belts. Moreover, on the shaft ends of the drive rollers 13 and 15 there are provided, for example, sprockets (not shown) which are engaged with a common endless chain linked with a drive source, thereby driving the drive rollers 13 and 15 in a synchronized rotational speed.

This sheet conveyance means 11 may be a part of the conveying means 2 shown in FIG. 1, in other words, the former may be partly coextensive with the latter, In case of the aim providing the pretreating apparatus 3 independently of the conveying means 2, the sheet transfer means 11 is to be provided separately within the pretreating apparatus 3 so as to receive the plastic sheets 1 conveyed by the upstream conveying means 2 and deliver them to the downstream conveying means 2 after the completion of treatment.

A first primer treatment means 20 is provided on one end (left side end in FIG. 2) of the sheet conveyance means 11. The means 20 has a friction means 21, a pressing means 22 and primer solution supply means 23, as shown in FIG. 5. Furthermore, a second primer treatment means 40 is disposed on the other side (right side in the drawing) of the sheet conveyance means 11 as apparent from FIG. 2. That means 40 also has a friction means 41, a pressing means 42 and a primer solution supply means 43. The friction means 21 and 41 comprise a frictional member made of a flexible porous member into which the primer solution can be impregnated as described later. The friction members are supplied with the primer solution from the corresponding primer solution supply means 23 and 43 in such a manner the surfaces of the frictions members are kept impregnated with a constant amount of primer solution.

Additionally, the pressing means 22 is mounted on the upper frame 12 through a mounting plate 24, while the pressing means 42 is mounted on the lower frame 14 by means of a mounting plate. 44. More particularly, the first and second primer treatment means are vertically opposite to each other in the arrangement of their respective friction means and the like.

Figure 3:
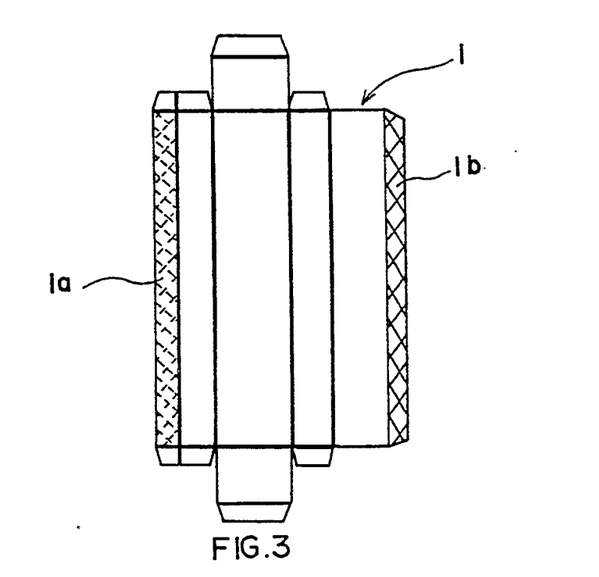
FIG. 3 is a top plan view showing an example of a plastic sheet to be primer-treated with the primer treatment means shown in FIG. 2.

An exemplary primer treatment means shown in FIG. 2 is designed to perform a primer treatment at one time on a pair of adhesive areas of the plastic sheet overlapped with each other, in other words, to perform a primer treatment at one time on adhesive area located on the front side of one edge of the plastic sheet and adhesive area located at the reverse side of the other edge. FIG. 3 illustrates a typical plastic sheet to which such adhesive manner is applicable. The plastic sheet 1 cut in accordance with a predetermined development to form a case includes a pair of adhesive areas 1a and 1b located at the opposing edges thereof. The adhesive areas 1a and 1b are correspondingly provided on the opposite sides of the sheet to be coated with the adhesive and brought together at the time of assembling to form a case. The adhesive areas 1a and 1b located on the opposite sides of the sheet must be separately subjected to the primer treatment preparatory to the application of the adhesive, and hence the apparatus shown in FIG. 2 has a pair of primer treatment means 20 and 40 provided on right and left side and arranged vertically opposite to each other with the plastic sheets to be conveyed therebetween.

Figure 4:
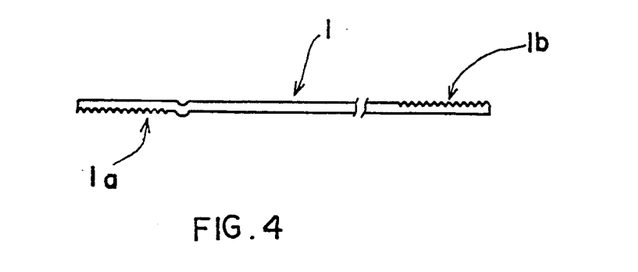
FIG. 4 is a sectional view of the plastic sheet shown in FIG. 3.

More specifically, the adhesive areas located at the right and left edges of the plastic sheets 1 conveyed by the sheet conveyance means 11 are allowed to pass through the first primer treatment means 20 and the second primer treating means 40, respectively. At that time, the adhesive area located on the undersurface (the reverse side) at the left edge of each of the plastic sheets 1 is coated with the primer solution for primer treatment by the lower friction means 21 of the first primary treating means 20. While on the contrary, the adhesive area located on the top surface at the right edge thereof is coated with the primer solution through the upper friction means 41 of the second primer treatment means 40. FIG. 4 shows the plastic sheet 1 having adhesive areas 1a and 1b thus subjected to simultaneous primer treatment for roughening the surface.

Referring next to FIG. 5, the friction means 21 of the first primer treatment means 20 comprises a friction member made of flexible porous member into which the primer solution can be impregnated. This friction member may include, for example, a flexible fibrous member such as a paper, cloth, and felt, and a flexible porous member having a continuous porosity such as sponge rubber and urethane foam.

Such friction member has a relatively high frictional coefficient as well as a superior mobility of the primer solution through the gaps or pores, and allows the absorption or impregnation of the primer solution into the multiplicity of gaps or pores and its maintenance. Accordingly, the primer solution is immigrated from the surface (top of the drawing) of the friction member to the plastic sheet. With a local depression in the amount of impregnation on the surface of the friction member, a further primer solution is immediately replenished from the inside (bottom of the drawing) of the friction member with the aid of capillarity, to thereby constantly maintain the amount of primer solution being impregnated on the surface of the friction member.

The top of the friction member 21 acting as a sheet contact surface is arranged to match the position through which the surface of the plastic sheet to be primer-treated passes. The sheet contact surface of the friction member 21 is serrated with a multiplicity of ridges orthogonal to the sheet movement direction, thus enhance the frictional force between the friction member and the plastic sheet. By maintaining the frictional force produced on the sheet contact surface of the friction member at a predetermined magnitude in this manner, the primer solution can be satisfactorily attached onto the plastic sheet. It is to be noted that the sheet contact surface may be planar if the coefficient of the friction member is enough large.

The pressing means serves to enhance the frictional force between the friction member and the plastic sheet surface by pressing the friction member of the friction means 21 against the plastic sheet surface, and to constantly maintain it. The pressing means 22 comprises a plurality of idler rollers 25 parallelly arranged orthogonally to the sheet movement direction, and the rectangular mounting plate 24 rotatably supporting the rollers 25. Although the mounting plate 24 is mounted on the upper frame 12 as described above, a mounting hole to be provided in the mounting plate 24 for the mount onto the frame may be of a slit-like configuration, to thereby ensure an adjustable interval between the idler rollers 25 and the top surface of the friction member. Additionally, a spring means may be provided on the fixing plate 24 so as to bias the idler rollers 25 toward the friction member.

The primer solution supply means 23 comprises a primer solution reservoir 26, a primer solution pipe 27, a regulating valve 28 and a primer solution supply source 29. The primer solution reservoir 26 is of a rectangular shape in section with the top opened to allow the friction member of the friction means 21 to be introduced or taken out therethrough. A pair of flanges 30 extend from one side wall of the primer reservoir 26 and the primer reservoir 26 is secured to the lower frame 14 by virtue of the flange 30. The primer solution pipe 27 has a tip which passes through the front wall of the primer reservoir 26 and opens into the inside thereof.

The primer supply source 29 serving to generate a predetermined head pressure may comprise, for example, a pump means, a tank placed in a higher position, or their combination. The primer solution within the primer solution supply source 29 enters the primer solution reservoir 26 via the regulating valve 28, and is impregnated into the lower portion of the friction member being immersed within the primer solution reservoir 26. Since the primer solution impregnated into the friction member is allowed to ascend by the influence of capillarity, the top surface of the frictional member, that is, the sheet contact surface is always kept wet by the primer solution.

The regulating valve may be a manual or automatic valve. By the use of automatic valve, the amount of a new primer solution equivalent to the amount by which the primer solution has reduced due to the application onto the plastic sheet from the friction member can be automatically supplied into the primer solution reservoir 26. In order to accomplish such way of supply, for example, the solution level within the primer solution reservoir 26 may be detected by a float-type or optical sensor to control the automatic valve in accordance with the obtained signals. The second primer treatment means 40 also has the same configuration as the first primer treatment means 21.

Figure 6:
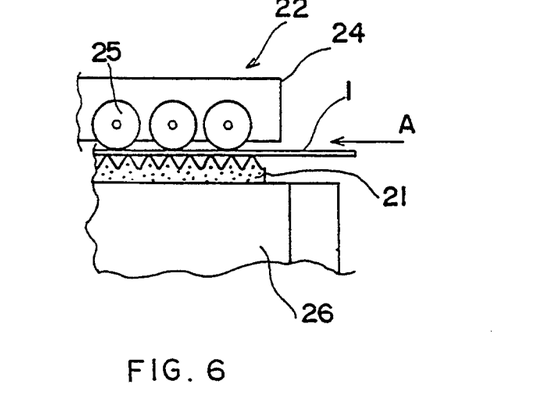
FIG. 6 is a partial front view showing a state in which the plastic sheet undergoes a primer treatment by the primer treatment means shown in FIG. 5.

FIG. 6 shows the primer treatment means in FIG. 5 which is primer-treating the plastic sheet. The plastic sheet 1 is conveyed at an unvaried lower speed in the direction of arrow A by the sheet conveyance means, while being caught between the sheet contact surface of the friction member of the friction means 21 and the undersurface of the idler rollers 25 of the pressing means 22 to be frictionally coated with the primer solution. Thus the portion of the plastic sheet to be primer-treated can be continuously primer-treated into belt-like configuration having an accurate width with a constant roughened rate.

The primer treatment means shown in FIG. 1 may be used for intermittent primer-treating operation. For example, there may be provided a drive arrangement (such as an air cylinder or an electrical actuator) for vertically displacing the primer solution reservoir 26 accommodating the friction member, and an optical sensor or the like for detecting whether the leading edge of the plastic sheet 1 reaches the extremity of the friction means 21, thereby lifting the primer solution reservoir 26 for a fixed time of period by driving the drive arrangement in accordance with the detection signals. In that case, the plastic sheet 1 is allowed to be brought into contact with the sheet contact surface for the primer treating during the ascending movement of the primer solution reservoir 26. This duration can be preset by, for example, a timer means so as to match the time during which the portion of the plastic sheet 1 to be primer-treated passes.

When the adhesive area of the plastic sheet 1 to be primer-treated is shorter than the overall length (the overall length in the moving direction) or when the adhesive area is divided into a plurality of subareas in the sheet moving direction, the primer treatment can be performed on only desired portion by the same configuration as described above. In this case, the timer means may be, for example, a program timer which issues one or plurality of drive instructions in any desired period of time.

Figure 7:
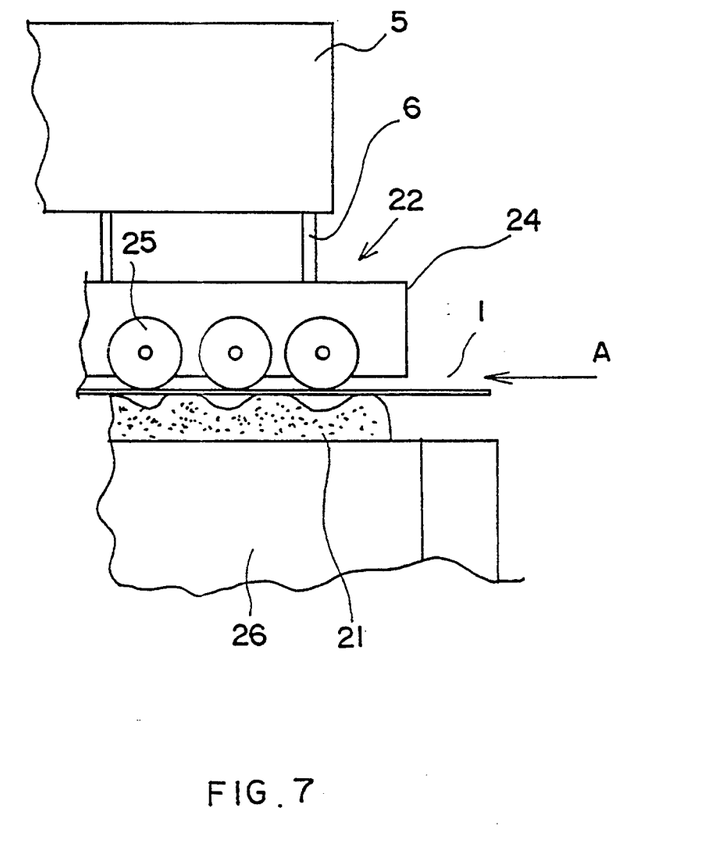
FIG. 7 is a partial front view showing another example of the primer treatment means shown in FIG. 6.

FIG. 7 is a variant of the arrangement shown in FIG. 6, in which the protrusions of the friction member 21 are each positioned in the middle of the corresponding adjacent rollers 25 parallelly journalled on the support member 24 which in turn is linked with a pressing fine adjustment displacing mechanism 5. The fine adjustment displacing mechanism 5 has a rod 6 slightly protruding or retracting by the drive force derived from the servomotor or the like, the tip of the rod 6 being securely attached to the support member. Instead, a protruding/retracting mechanism making use of a screw may be used to manually displace the support member 24 for the fine adjustment.

Then, in view of the quality or surface roughening of the plastic sheet to be treated, the distance between the undersurfaces of the idler rollers and the top surface of the friction member 21 is adjusted.

Figure 8:
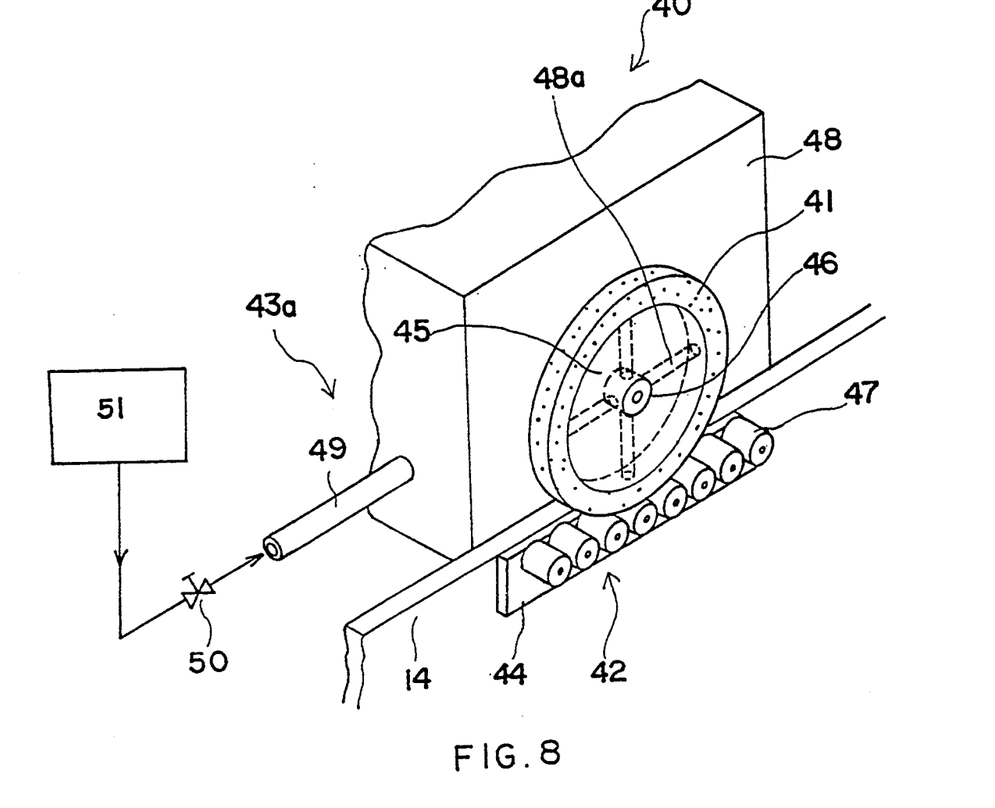
FIG. 8 is a partly enlarged perspective view showing another example of the primer treatment means shown in FIG. 2.

FIG. 8 is a partially enlarged perspective view showing another embodiment of the primer treatment means. The primer treatment means 40 includes a friction means 41, a pressing means 42, and a primer solution supply means 43. The friction means 41 comprises a rotary friction member positioned above the sheet conveyance means 11 (See FIG. 1). The pressing means 42 is arranged below and opposing the friction member.

The rotary friction member having an annular shape is mounted on the outer periphery of the cylinder 86 made of a rigid material such as metal or rigid plastic. A shaft 46 of the cylinder 45 passing through both walls of the primer solution reservoir 43 in a liquid-tight manner and being rotatably supported therein is linked with a drive source not shown outside the reservoir for a constant speed of revolution thereof. The shaft 46 is hollow, and has at its portion resting within the primer reservoir 47 a communication hole which communicates with the inside of the reservoir. Additionally, outside the primer solution reservoir 48 (or outside of the front wall in the drawing) the hollow portion of the shaft 46 opens into the friction member through a plurality of communication pipes 48(a). Such construction enables the primer solution within the primer solution reservoir 47 to be supplied into the friction member by way of a communication pipe 48a.

The pressing means 42 includes a plurality of idler rollers 47 parallelly arranged and rotatably supported on a plurality of shafts orthogonal to the sheet conveyance direction, and a rectangular mounting plate 44 for fixing the shafts. The mounting plate 44 is mounted on the lower frame 14 as described above, a mounting hole provided in the mounting plate 44 and for mounting the frame may be shaped into a slit to allow any adjustment of the interval between the idler roller 47 and the top surface of the friction member. Additionally, there may be a spring means provided on the mounting plate 44 for urging the idler roller 47 toward the friction member.

The primer supply means 43 comprises a primer solution reservoir 48, a primer solution pipe 49, and regulating valve 50 and a primer solution supply source 51. The functions of these members are the same as those shown in FIG. 5. Besides, the primer solution reservoir 48 is mounted on the upper frame 12 shown in FIG. 2 by way of a pair of flanges (not shown) extending from the side wall of the reservoir 48.

Figure 9:
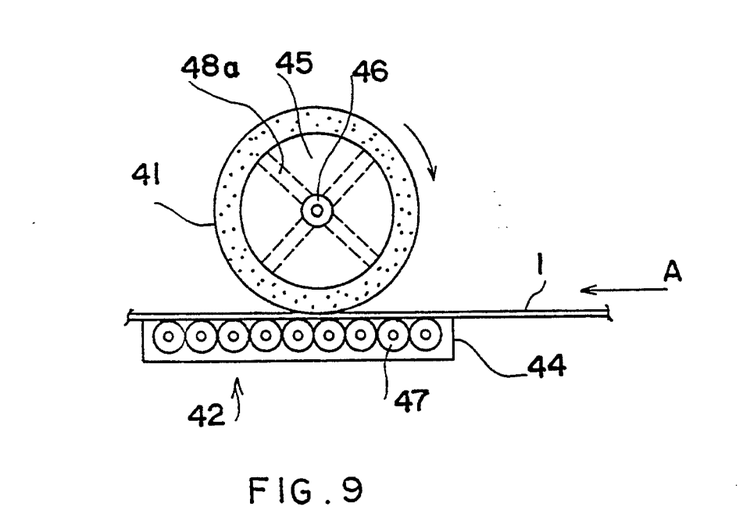
FIG. 9 is a partly front elevation showing a state in which the plastic sheet is being subjected to a primer treatment by the primer treatment means shown in FIG. 8.

FIG. 9 shows a state where the primer treatment means shown in FIG. 8 is used for the primer treatment of the plastic sheet. The plastic sheet 1 is conveyed by the sheet conveyance means in the direction of arrow A at a constant lower speed, while the friction member of the friction means 41 is rotated in the same direction as the sheet conveyance direction and at a circumferential speed higher than the speed of the sheet conveyance. Then the plastic sheet 1 is frictionally caught between the undersurface of the friction member and the top surface of the idler roller 47 of the pressing means 42, during which the sheets are coated with the primer solution. Due to this, portions of the plastic sheet 1 to be primer-treated are continuously primer-coated into a slit having an accurate width with a constant roughened rate.

While the cylinder 45 (and accordingly the friction member) are rotated in the same direction as that of the sheet conveyance as described above, the peripheral speed thereof is desirably higher than that of the sheet conveyance speed, more desirably, two or three times the latter, thereby producing a predetermined frictional force with respect to the plastic sheet for the application of the primer solution. It should be noted that the rotational direction is possibly the same as the direction of the sheet conveyance, which is not desirable in case where the leading edge of the plastic sheet is liable to be turned up due to the presence of the friction member 8.

The frictional means of the primer treatment means shown in FIG. 5 and FIG. 8 includes a single friction member, and naturally may include a plurality of friction members juxtaposed with any intervals and in parallel with the sheet conveyance direction. In this case, one primer solution reservoir may be shared or a plurality of reservoirs may be separately provided. By virtue of the plurality of friction members, the primer treatment can be simultaneously performed on a multiplicity of points by a single passage of the plastic sheet through the pretreating apparatus. In addition, each of the friction means may be vertically displaced separately during the desired period of time by the drive unit and the control means as described earlier.

It is to be appreciated that although the apparatus shown in FIG. 2 has the first and second primer treatment means 20 and 40 provide correspondingly on both sides of the sheet conveyance means 11, one of the primer treatment means may be omitted when one side of the plastic sheet is only subjected to the primer treatment.

Figure 10:
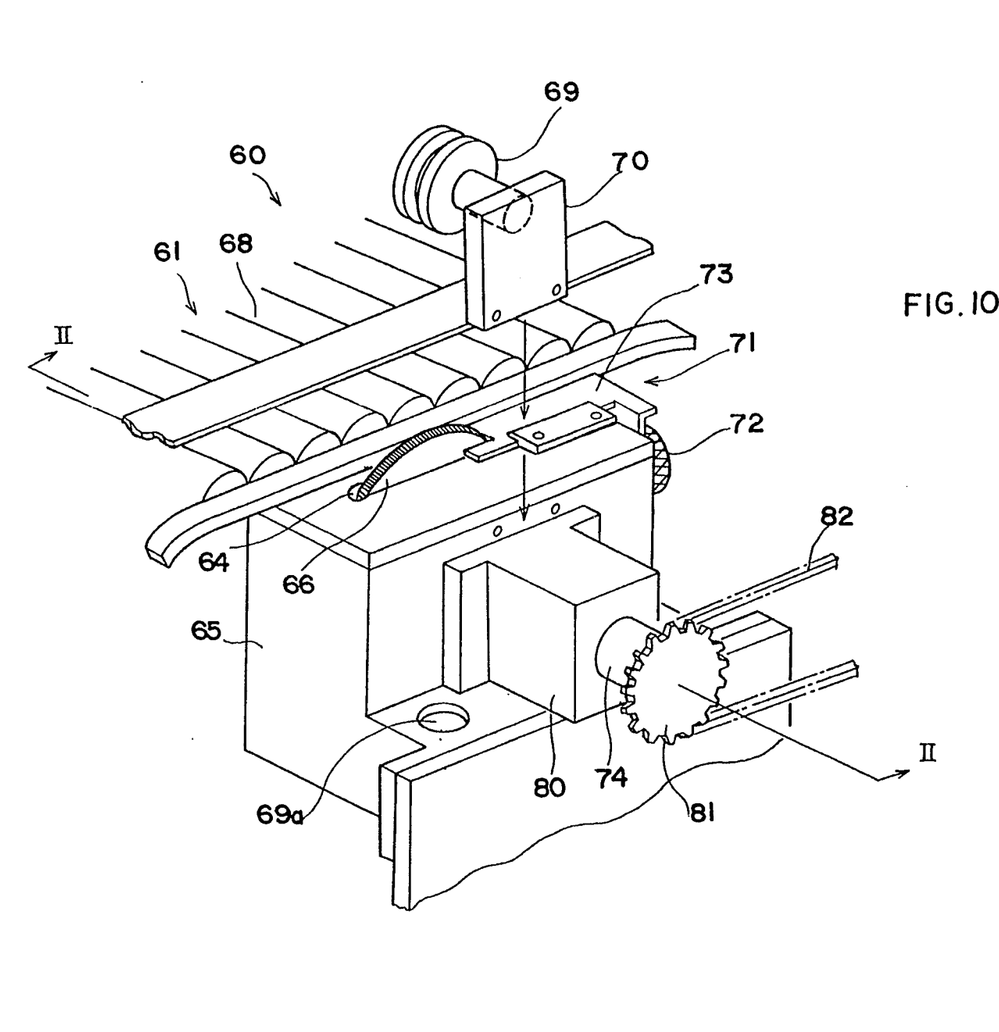
FIG. 10 is a partly exploded fragmentary perspective view showing an example of the adhesive application means employed in the pretreating apparatus of the present invention.
Figure 11:
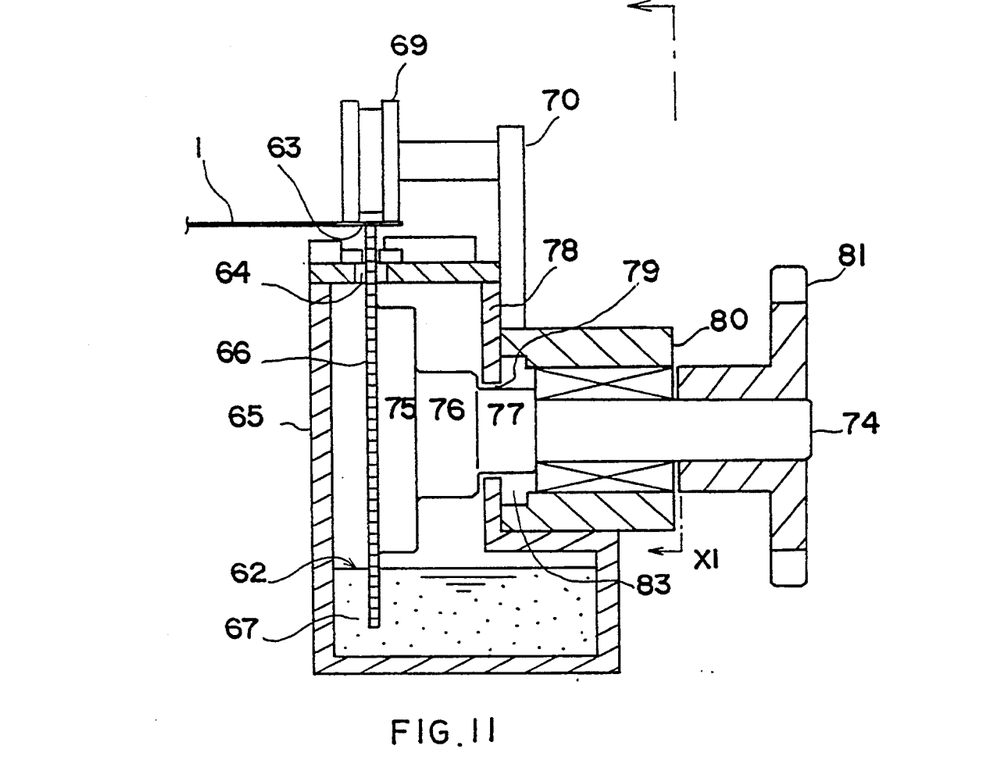
FIG. 11 is a sectional view taken along the line II—II in the assembled condition shown in FIG. 10.
Figure 12:
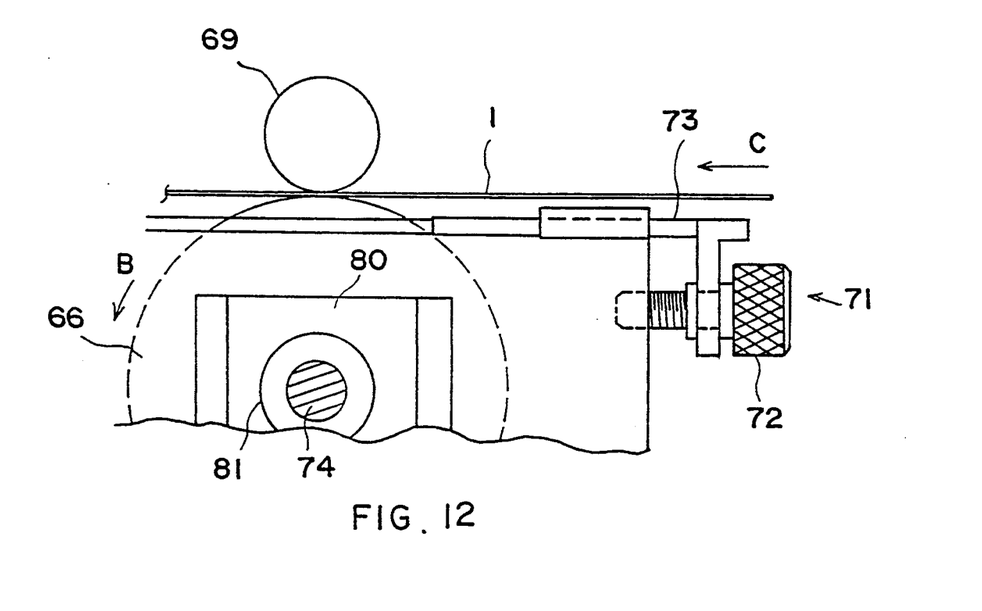
FIG. 12 is a view from the line XI—XI in FIG. 11.

FIG. 10 through 12 illustrate an exemplary adhesive application means preferable in the pretreating apparatus of the present invention. This means is suitable for the application of the cyan instantaneous adhesive for the adhesion of polyolefin plastic sheet having poor adhesive properties.

FIG. 10 is a perspective view of the adhesive application means, while FIG. 11 is a sectional view thereof taken along a line II—II. Incidentally, a part is shown exploded for the illustrative purpose. As is clear from these figures, an adhesive applying apparatus 60 comprises a sheet conveyance means 61, a container 65 having at its lower portion an adhesive supply section 62 and at its upper portion an opening 64 facing the sheet passage surface 63, and a transfer disc 66 rotatably accommodated within the container 65. The outer periphery of the transfer disc 66 has a portion in contact with the adhesive supply section 62, and another portion in contact with the sheet passage surface 63 through the opening 64. The rotation of the transfer disc 66 allows the adhesive 67 of the adhesive supply section 62 to be conveyed onto the underside of the plastic sheet 1 being conveyed through the sheet passage surface 63.

The sheet conveyance means 61 may be of the same configuration as that of the sheet conveyance means 11 shown in FIG. 2. More specifically, the means 61 comprises a plurality of upper drive rollers rotatably supported correspondingly on a plurality of shafts horizontally mounted on the upper frame, and a plurality of lower drive rollers rotatably supported on a plurality of shafts horizontally mounted on the lower frame, the roller drive rollers being rotated together by an upper endless belt, the lower drive roller being rotated together by a lower endless belt, and the plastic sheet 1 being caught in the gap defined by both the end belts for the conveyance of thereof.

The transfer disc 66 made of a rigid material having a rigidity such as metal or rigid plastic has a thickness suitable for the widths of the adhesive areas of the plastic sheet 1. Preferably the outer surface of the transfer disc 66 is subjected to a roughening treatment such as knurling in order to increase the adhesive strength of the adhesive. The rotary disc 66 is at its lower portion immersed in the adhesive supply section 62 in such a manner that the rotation of the disc causes the adhesive 67 of the adhesive supply section 62 to adhere to the outer periphery of the transfer disc 66.

The container 65 is at its lower portion swelled to form the adhesion supply section 62 for accommodating the adhesive 67. The adhesive 67 to be accommodated into the adhesive supply section 62 can be replenished through a bung hole 69a provided on the container 65. The bung hole 69a is positioned lower than the bearing portion 80 so that the top surface of the adhesive never reaches a through-hole 79 adjacent to the bearing section 80, and only the lower portion of the transfer disc 66 is always immersed. This is due to the fact that if the adhesive is filled up to the height of the bung hole 69a, the further supply of the adhesion will overflow through the bung hole.

Incidentally, the bung hole 69a may be connected with an external adhesive replenishing apparatus (for example, an automatic replenishing apparatus including a detecting means for detecting the level of the adhesive supply section 62, and a replenishing pump which is controlled based on the signal transmitted from the detecting means) for automatic replenishment of the adhesive.

The opening 64 of the container 65 is positioned immediately below the sheet passage surface 63 of the plastic sheet 1, and the upper periphery of the transfer disc 66 extends upward through the opening 64. The sheet passage surface 63 is provided with a press roller facing the upper periphery of the transfer disc 66. The outer periphery of the press roller 69 presses the plastic sheet 1 against the upper periphery of the transfer disc, thereby ensuring a reliable transfer of the adhesive by the transfer disc 66. The outer periphery of the press roller 69 may be planar, but preferably is grooved in the circumferential direction at its center as shown. The press roller has a shaft fitted to a bracket 70 which in turn is screwed to the side wall of the container 65.

An adhesive regulating means 71 is provided on the end of the opening 64 through which the upper periphery of the transfer disc 66 protrudes as shown in FIG. 12. The adhesive regulating means 71 comprises a set bolt 72 screwed in a bolt hole provided on the upper side wall of the container 65, and a scraper 73 attached to the set bolt 72. The extremity of the scraper 73 is provided with a slit having a width slightly larger than the thickness of the transfer disc 66 a part of which is inserted into the slit. In order to adjust the volume of the adhesive immediately before the transfer of the transfer disc 66 rotating in the direction shown by the arrow B, the set bolt 72 is rotated to slide the scraper 73 horizontally, thereby adjusting the interval between the outer periphery of the transfer disc 66 and the bottom of the scraper 73.

The transfer disc 66 is rotatably supported on a horizontal shaft 74. The horizontal shaft 74 includes three shoulders 75, 76 and 77 each having a different diameter, the largest diameter shoulder 75 being secured to the side of the transfer disc 66, the smallest diameter shoulder 77 passing through a through-hole 79 provided in a partition wall 78 and finally being journalled in the bearing 80.

According to the experiments carried out by the present inventors, for the use of cyano instantaneous adhesive ordinarily having viscosity of the order of 150 to 200 cps (25°), the inner diameter of the through-hole 79 is about 0.7 mm to 2.0 mm, preferably about 1.0 mm to 2.0 mm larger than the outer diameter of the horizontal shaft 74 at its penetrating portion, that is, the outer diameter of the shoulder 77. With the clearance less than about 0.7 mm, the instantaneous adhesive is liable to rapidly set in the gap, particularly, in the vicinity of its entrance, which may lead to a locking of the horizontal shaft 74. On the contrary, with the clearance over about 2.0 mm the instantaneous adhesive is apt to flow out toward the bearing 80.

Additionally, the end of the horizontal shaft 74 is provided with a sprocket 81 which is turned through a chain 82 (FIG. 10) driven by a drive source not shown. An adhesive stop 83 is also formed between the partition wall 78 (FIG. 11) and the bearing 80.

The function of the adhesive application means 60 will next be explained. The predetermined amount of adhesive 67 is first injected into the adhesive supply section 68 through the bung hole 69a of the container 66 (FIG. 10), and then the transfer disc 66 is rotated at a predetermined speed in the direction of arrow B (See FIG. 12). Note that the transfer disc 66 is rotated with the upper periphery thereof being in contact with the outer periphery of the press roller 69. The adhesive 67 of the adhesive supply section 62 is allowed to adhere to the outer periphery of the transfer disc 66, and the amount of the adhesion for transfer is properly adjusted at the opening 64 with the aid of the adhesive regulating means 71. The additional adhesive which has been scraped by the adhesive regulating means 71 falls into the container 65 and is again recovered into the adhesive supply section 62.

Subsequently, the plastic sheet 1 to be coated with the adhesive is moved in the direction of arrow B (see FIG. 12) by the sheet conveyance means 61, so that the adhesive is applied onto the plastic sheet 1 during the passage of the sheet between the transfer disc 66 and the press roller 69. In this manner, the multiplicity of plastic sheets 1 can be reliably coated with the adhesive in sequence at a higher accuracy. These series of movements may be controlled by the use of, e.g., a control means comprising a sensor for detecting the position of plastic sheets and a control circuit, which is well known to those skilled in the art.

Irrespective of the fall down and scatter of the adhesive within the container 65 during the rotation of transfer disc 66, the flow of the adhesive toward the bearing 80 and accordingly the adhesion thereonto can be prevented by virtue of sealing effects of the through-hole 79 of the partition wall 78 described above as well as the influence of the adhesive stop 83.

The adhesive application means shown in FIGS. 10 through 12 are applicable to intermittent adhesive applying operations. In order to enable the container 65 to be vertically displaced, for example, the container 65 is attached to the drive (e.g., such as the air cylinder or electric actuator) while there is further provided an optical sensor or the like for detecting that the leading edge of the plastic sheet 1 has reached the extremity of the transfer disc 66 of the adhesive application means. As a result, the drive is driven in accordance with thus obtained detection signals to ascend the container 66 only for a predetermined period of time. Only when the container 66 is in a ascended position, the plastic sheet 1 comes into contact with the transfer disk 66 for the application of the adhesive. This contact duration can be preset by using, for example, a timer means so as to match the passage timing of the portion of the plastic sheet 1 to be coated with the adhesive, that is, the adhesive areas thereof.

Also in case where the adhesive area of the plastic sheet 1 does not extend across the overall length of the sheet (full length in the moving direction), or where there locally exist a plurality of adhesive areas, the application of the adhesive can be performed exclusively on the desired contact areas of the plastic sheet 1 by the adoption of the same construction as the above. In that case, a program timer means is preferably used which issues one or a plurality of drive instructions in the predetermined preset period of time.

The above description was made for a single transfer disc 66. Naturally, a plurality of transfer discs may be juxtaposed at any intervals in parallel with the sheet moving direction. The provision of the plurality of transfer discs 66 ensures a simultaneous application of the adhesive onto the plurality of areas by only one passage of the sheet through the plastic sheet adhesive application means. Moreover, vertical movements of the containers may be executed separately for a desired period of time. In the case of the provision of a plurality of transfer discs 66, a single container 65 may be shared by each of the transfer discs 66 or alternatively a plurality of containers 65 may be provided individually for each of the transfer discs 66.

The pretreating apparatus of the present invention includes the primer treatment means having an unique structure as described above, and hence ensures a constantly reliable primer treatment extremely high in accuracy and speed, which results in a uniform primer treatment free from variability. Accordingly, the use of the apparatus of the present invention realizes an automatization of the adhesion process of the plastic sheet having poor adhesive properties.

In addition, the adoption of the adhesive application means having the structure like the above embodiments in the pretreating apparatus of the present invention enables the use of an adhesive which is extremely easy to interlock such as a cyano instantaneous adhesive.

What is claimed is:

1. A pretreating apparatus for the adhesion of plastic sheets including a primer treatment means, said primer treatment means comprising:
   a sheet conveyance means for conveying the plastic sheets in one direction at a constant speed;
   a friction means having a friction member with a flexible porous member and arranged to be in contact with adhesive areas of the plastic sheets to be subjected to a primer treatment;
   a press means disposed facing said friction means and for pressing the plastic sheets against said friction member; and
   a primer solution supply means for supplying the primer solution to said friction member,
   wherein the top surface of said friction member facing a sheet's contact surface is knurled with a multiplicity of ridges orthogonal to the sheet advancing direction.

2. A pretreating apparatus according to claim 1, wherein said press means includes a plurality of idler rollers arranged in parallel orthogonally to the direction in which the sheets advance, and a support member for rotatably supporting said idler rollers.

3. A pretreating apparatus according to claim 1, wherein said press means includes a plurality of idler rollers arranged in parallel orthogonally to the sheet advancing direction, and a support member for rotatably supporting said idler rollers, said support member being capable of engaging with and disengaging from said friction member by way of a fine adjustment displacing mechanism.

4. A pretreating apparatus according to claim 1, wherein said primer solution supply means includes a primer solution reservoir having at its top an opening for receiving the lower portion of said friction member to immerse into the primer solution for the impregnation therewith so that the primer solution is supplied onto the sheet contact surface of said friction member which extends upward from said opening under the influence of capillarity, the top surface of said friction member being brought into contact with the adhesive area of the plastic sheet to be subjected to a primer treatment.

5. A pretreating apparatus according to claim 1, wherein said primer solution reservoir is automatically replenished with the primer solution by way of an external primer solution supply source.

6. A pretreating apparatus according to claim 1, wherein said friction means includes an annular rotary friction member.

7. A pretreating apparatus according to claim 1, wherein a pair of said primer treatment means are correspondingly provided on both sides of said sheet conveyance means vertically oppositely to each other, thereby ensuring a simultaneous primer treatment on both the adhesive area to be primer-treated located at one edge on the top surface of the plastic sheet and the adhesive area to be primer-treated located at the other edge on the undersurface thereof.

8. A pretreating apparatus according to claim 1, wherein said sheet conveyance means includes a plurality of juxtaposed upper drive rollers and a plurality of juxtaposed lower drive rollers, said upper drive rollers being rotated together by an upper endless belt, said lower drive rollers being rotated together by a lower endless belt, the plastic sheet being caused to advance through a gap defined by said two endless belts.

9. A pretreating apparatus according to claim 4, further including an adhesive application means following said primer treatment means in the sheet advancing direction and including a sheet conveyance means for conveying a plastic sheet in one direction at a constant speed, a container having at its lower portion an adhesive supply section and having at its upper portion an opening facing a sheet passage surface in said sheet conveyance means, and a transfer disc rotatably accommodated within said container and having an upper outer periphery being in contact with said adhesive supply section and a lower outer periphery coming into contact with said sheet passage surface through said opening, the adhesive of said adhesive supply section being transferred onto the adhesive area of the plastic sheet moving through the sheet passage surface by virtue of the rotation of said transfer disc, said transfer disc being rotatably supported on a horizontal shaft, said horizontal shaft extending through the interior of said container and passing through a through-hole provided in a partition wall thereof and being journalled in a bearing, said through-hole having an inner diameter about 0.7 to 2.0 mm larger than the outer diameter of the portion of said horizontal shaft which is received in the through-hole, and an adhesive stop being provided between said through-hole and said bearing.

10. A pretreating apparatus according to claim 9, further comprising a bung hole for the adhesive positioned level with the lower portion of said transfer disc.

11. A pretreating apparatus according to claim 9, wherein said sheet conveyance means in said adhesive application means includes a plurality of juxtaposed upper drive rollers and a plurality of juxtaposed lower drive rollers, said upper drive rollers being rotated together by an upper endless belt, said lower drive rollers being rotated together by a lower endless belt, the plastic sheet being caused to advance through a gap defined by said two endless belts.

12. A pretreating apparatus according to claim 9, wherein said transfer disc in said adhesive application means is made of a rigid material and has a roughened outer peripheral surface.

13. A pretreating apparatus according to claim 9, wherein said adhesive application means is suitable for cyano instantaneous adhesive.

14. A pretreating apparatus for the adhesion of plastic sheets including a primer treatment means, said primer treatment means comprising:
   a sheet conveyance means for conveying the plastic sheets in one direction at a constant speed;
   a friction means having a friction member with a flexible porous member and arranged to be in contact with adhesive areas of the plastic sheets to be subjected to a primer treatment;
   a press means disposed facing said friction means and for pressing the plastic sheets against said friction member; and
   a primer solution supply means for supplying the primer solution to said friction member,
   wherein the top surface upper portion of said friction member facing the sheet's contact surface is knurled with a multiplicity of ridges orthogonal to the sheet advancing direction, and said press means includes a plurality of idler rollers arranged in parallel orthogonally to the sheet advancing direction and a support member for rotatably supporting said idler rollers, said idler rollers being disposed between said ridges of said friction member.

15. A pretreating apparatus according to claim 14, wherein said press means includes a plurality of idler rollers arranged in parallel orthogonally to the direction in which the sheets advance, and a support member for rotatably supporting said idler rollers.

16. A pretreating apparatus according to claim 14, wherein said press means includes a plurality of idler rollers arranged in parallel orthogonally to the sheet advancing direction, and a support member for rotatably supporting said idler rollers, said support member being capable of engaging with and disengaging from said friction member by way of a fine adjustment displacing mechanism.

17. A pretreating apparatus according to claim 14, wherein said primer solution supply means includes a primer solution reservoir having at its top an opening for receiving the lower portion of said friction member to immerse into the primer solution for the impregnation therewith so that the primer solution is supplied onto the sheet contact surface of said friction member which extends upward from said opening under the influence of capillarity, the top surface of said friction member being brought into contact with the adhesive area of the plastic sheet to be subjected to a primer treatment.

18. A pretreating apparatus according to claim 14, wherein said primer solution reservoir is automatically replenished with the primer solution by way of an external primer solution supply source.

19. A pretreating apparatus according to claim 14, wherein said friction means includes an annular rotary friction member.

20. A pretreating apparatus according to claim 14, wherein a pair of said primer treatment means are correspondingly provided on both sides of said sheet conveyance means vertically oppositely to each other, thereby ensuring a simultaneous primer treatment on both the adhesive area to be primer-treated located at one edge on the top surface of the plastic sheet and the adhesive area to be primer-treated located at the other edge on the undersurface thereof.

21. A pretreating apparatus according to claim 14, wherein said sheet conveyance means includes a plurality of juxtaposed upper drive rollers and a plurality of juxtaposed lower drive rollers, said upper drive rollers being rotated together by an upper endless belt, said lower drive rollers being rotated together by a lower endless belt, the plastic sheet being caused to advance through a gap defined by said two endless belts.

22. A pretreating apparatus according to claim 14, further including an adhesive application means following said primer treatment means in the sheet advancing direction and including a sheet conveyance means for conveying a plastic sheet in one direction at a constant speed, a container having at its lower portion an adhesive supply section and having at its upper portion an opening facing a sheet passage surface in said sheet conveyance means, and a transfer disc rotatably accommodated within said container and having an upper outer periphery being in contact with said adhesive supply section and a lower outer periphery coming into contact with said sheet passage surface through said opening, the adhesive of said adhesive supply section being transferred onto the adhesive area of the plastic sheet moving through the sheet passage surface by virtue of the rotation of said transfer disc, said transfer disc being rotatably supported on a horizontal shaft, said horizontal shaft extending through the interior of said container and passing through a through-hole provided in a partition wall thereof and being journalled in a bearing, said through-hole having an inner diameter about 0.7 to 2.0 mm larger than the outer diameter of the portion of said horizontal shaft which is received in the through-hole, and an adhesive stop being provided between said through-hole and said bearing.

23. A pretreating apparatus according to claim 22, further comprising a bung hole for the adhesive positioned level with the lower portion of said transfer disc.

24. A pretreating apparatus according to claim 22, wherein said sheet conveyance means in said adhesive application means includes a plurality of juxtaposed upper drive rollers and a plurality of juxtaposed lower drive rollers, said upper drive rollers being rotated together by an upper endless belt, said lower drive rollers being rotated together by a lower endless belt, the plastic sheet being caused to advance through a gap defined by said two endless belts.

25. A pretreating apparatus according to claim 22, wherein said transfer disc in said adhesive application means is made of a rigid material and has a roughened outer peripheral surface.

26. A pretreating apparatus according to claim 22, wherein said adhesive application means is suitable for cyano instantaneous adhesive.

* * * * *